No. 837,924. PATENTED DEC. 11, 1906.
O. GUITAR.
COMBINED CLOTHES WASHER AND WRINGER.
APPLICATION FILED NOV. 7, 1905.

3 SHEETS—SHEET 1.

WITNESSES:
Jos. A. Ryan
C. E. Trainor

INVENTOR
ODON GUITAR
BY Munn & Co.
ATTORNEYS

No. 837,924. PATENTED DEC. 11, 1906.
O. GUITAR.
COMBINED CLOTHES WASHER AND WRINGER.
APPLICATION FILED NOV. 7, 1905.
3 SHEETS—SHEET 2.
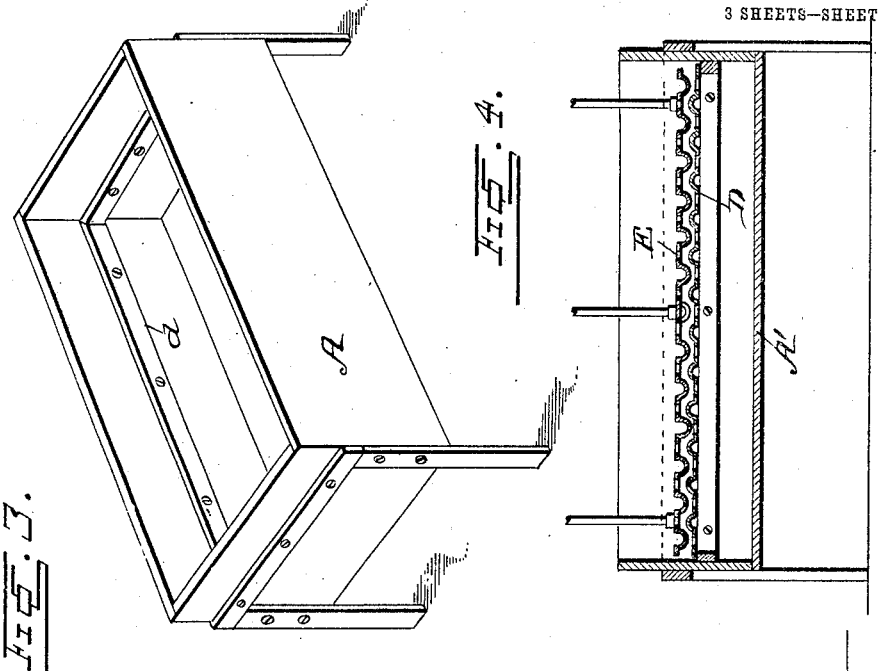
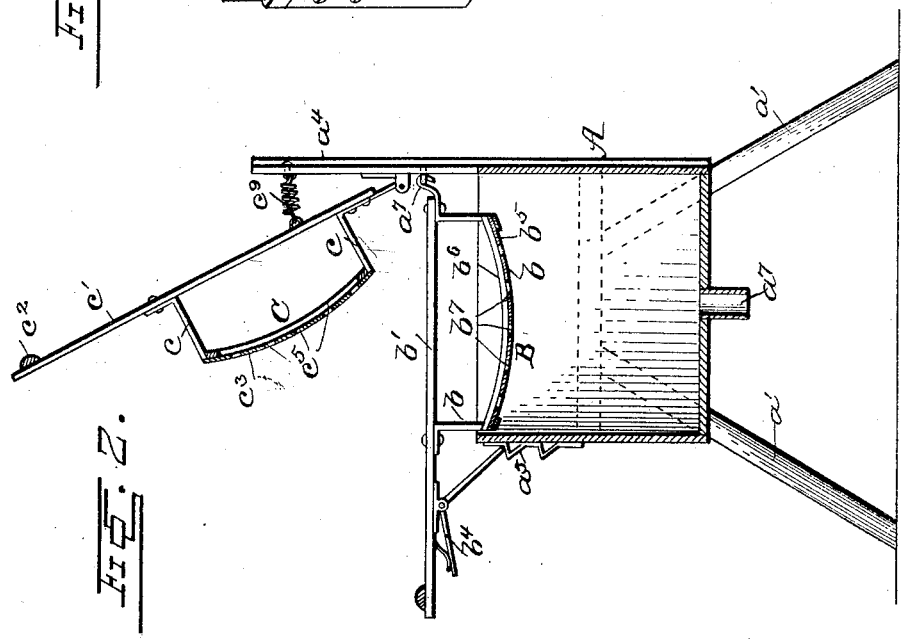
WITNESSES:
Jos. A. Ryan.
C. E. Trainor
INVENTOR
ODON GUITAR
BY Munn & Co.
ATTORNEYS No. 837,924. PATENTED DEC. 11, 1906.
O. GUITAR.
COMBINED CLOTHES WASHER AND WRINGER.
APPLICATION FILED NOV. 7, 1905.

3 SHEETS—SHEET 3.

WITNESSES:
Jos. A. Ryan
C. E. Trainor

INVENTOR
ODON GUITAR
BY Munn & Co.
ATTORNEYS

UNITED STATES PATENT OFFICE.

ODON GUITAR, OF COLUMBIA, MISSOURI.

COMBINED CLOTHES WASHER AND WRINGER.

No. 837,924.

Specification of Letters Patent.

Patented Dec. 11, 1906.

Application filed November 7, 1905. Serial No. 286,225.

*To all whom it may concern:*

Be it known that I, ODON GUITAR, a citizen of the United States, residing at Columbia, in the county of Boone and State of Missouri, have invented new and useful Improvements in a Combined Clothes Washer and Wringer, of which the following is a specification.

The invention consists in certain novel features of construction and in combination of parts more fully and particularly described hereinafter and pointed out in the claims.

Figure 1:
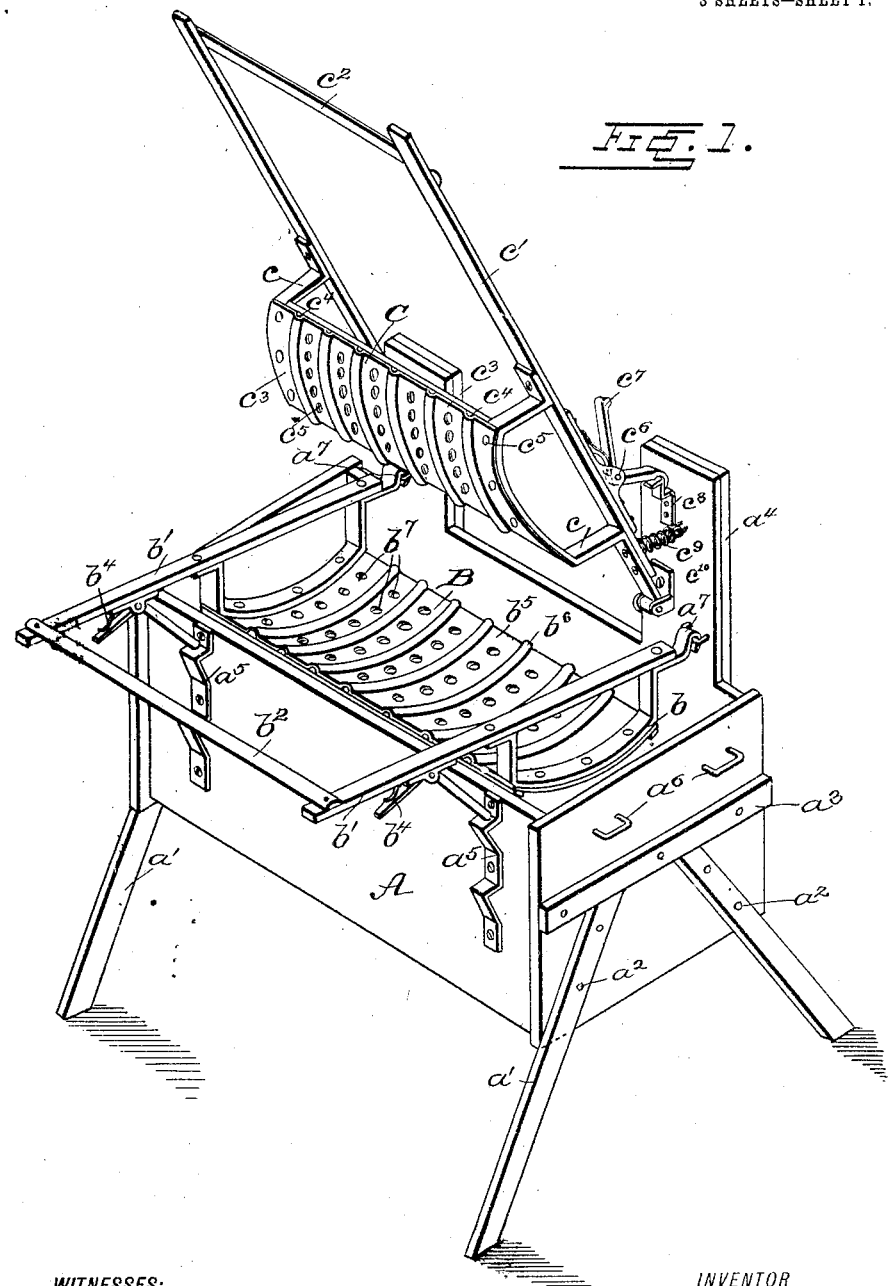
Figure 5:
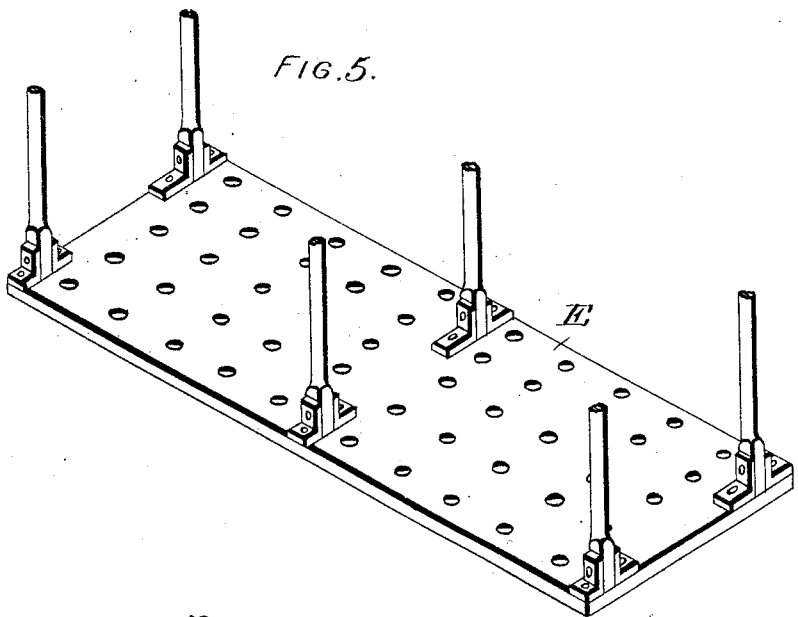
Figure 6:
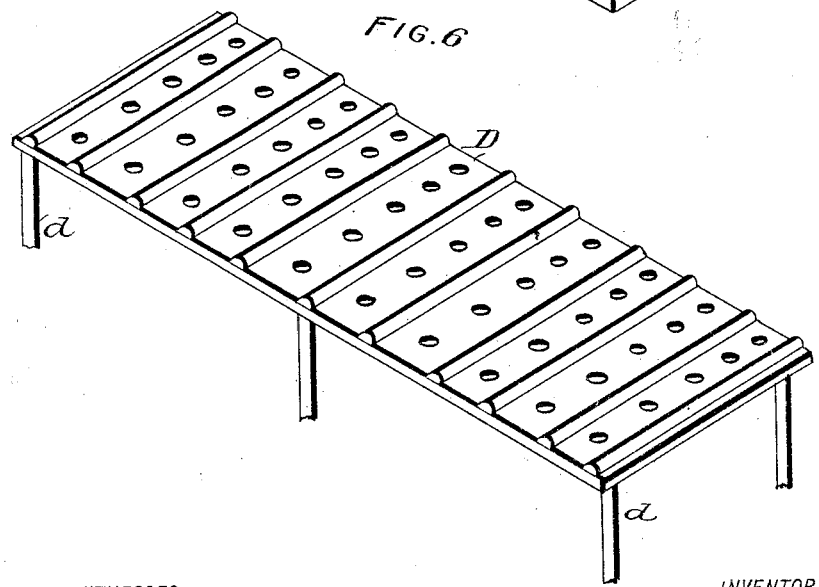

Referring to the accompanying drawings, Figure 1 is a perspective view of my device for domestic uses. Fig. 2 is a transverse vertical section thereof. Fig. 3 is a perspective view of a tank adapted for use in a power-machine. Fig. 4 is a vertical longitudinal section through a modification adapted for use as a power-machine. Fig. 5 is a perspective view from above of the presser-plate of the power-machine, and Fig. 6 is a perspective view from below of Fig. 5.

In the present embodiment of my invention I make use of the rectangular tank A, provided with legs $a'$, removably secured thereto by screws $a^2$, and across the ends of the tank and abutting against the ends of the legs is a brace $a^3$, likewise removably secured.

A facing $b^5$, of rubber or other elastic material and having at intervals transverse corrugations $b^6$, is secured to a concave presser-bed B, which is in turn secured to the brackets $b$, and between the corrugations transverse series of holes $b^7$ perforate both plate and facing. The concave presser-bed B is secured to brackets $b$, mounted on bars $b'$, connected by a cross-bar $b^2$ and hinged at $a^7$ to brackets $a^4$, arising from the tank A. Spring-actuated latches $b^4$, mounted in bearings on the bars $b'$, engage ratchet-bars $a^5$ on the tank A for supporting the plate in different positions.

A convex presser-plate C, provided with a facing $c^3$ of the same material as the facing $b^5$ and having corrugations $c^4$ and perforations $c^5$, is secured to brackets $c$, mounted on bars $c'$, connected by a cross-piece $c^2$ and hinged at $c^{10}$ to the brackets $a^4$ on the tank A. A spring-actuated latch $c^7$, mounted in bearings $c^6$ on the right-hand bar $c'$, engages a catch $c^8$ on the bracket $a^4$ for holding the plate C in its elevated position. Coil-springs $c^9$, attached to the brackets $a^4$ and the bars $c'$, assist in elevating the plate when in use.

The corrugations on the bed B and the plate C are staggered with relation to each other, the corrugations on one plate corresponding in position to the perforations in the other, and for convenience in transportation handles $a^6$ are provided on the tank.

In operation the tank is partially filled with water and the clothes are placed on the presser-bed B and the bed is lowered until the clothes are immersed in the water. By alternately elevating and depressing the presser-plate C the water is alternately drawn through and expressed out of the clothes. After the clothes are properly cleaned the presser-bed B is elevated so that the spring-latches engage the uppermost notch of the ratchet-bar, removing the clothes from the water, and the plate C is again lowered to express the water from the cleansed clothes. The clothes are then removed from the pressing-bed and the operation is repeated. After the clothes have been thoroughly "washed and cleansed" the suds-water will be withdrawn through the faucet inserted in the bottom of the tank and clean water introduced instead, when the same operation will be performed in wringing that was carried out in washing the clothes.

In the modification shown in Figs. 3, 4, 5, and 6 the lower plates D rest directly on supports $d$ secured in the tank, and instead of being concave the plate is flat, but otherwise similar in every respect to the plate B. The upper plate E is also flat, but in all other respects is similar to plate C. The same process is observed in operating the "modification" in every respect as is carried out in the use of the domestic machine, with like results.

Having thus described my invention, what I claim as new, and desire to secure by Letters Patent, is—

1. In a machine of the character described, a tank provided with legs, a concave presser-bed therein, a flexible facing secured to the presser-bed and provided with transverse corrugations, a hinged frame to which said bed is secured, a spring-actuated latch upon said frame and adapted to support the same, a convex presser-plate for coacting with said presser-bed, a flexible facing secured to said presser-plate and provided with transverse corrugations staggered with relation to the corrugations on the presser-bed, the bed and the plate having transverse series of perforations between the corrugations, a hinged frame to which said convex plate is secured, a coil-spring for securing said convex plate normally elevated, and means whereby the plate may be elevated and depressed.

2. In a machine of the character described, a tank, a concave presser-bed therein, an elastic facing secured to the presser-bed and provided with transverse corrugations, a frame supporting said presser-bed, means whereby to adjust said frame in the tank, a convex presser-plate hinged to the tank and adapted to coact with said presser-bed, an elastic facing secured to said presser-plate and provided with transverse corrugations staggered with relation to the corrugations in the lower plate, and means for retaining the presser-plate normally out of contact with the bed.

3. A combined clothes washer and wringer, comprising a presser-bed, an elastic facing on the operating-face of the presser-bed, transverse corrugations on the facing, the bed and facing having perforations therethrough between the corrugations, a presser-plate adapted to coact with the presser-bed, an elastic facing on the operative face of the presser-plate, transverse corrugations on the facing, the presser-plate and facing having perforations therethrough between the corrugations, and means for moving the presser-plate.

4. In a combined clothes washer and wringer, a tank provided with legs, a frame hinged to the tank, a presser-bed mounted on the frame, a spring-actuated latch on the frame, and means on the tank for engaging the latch to support the frame.

ODON GUITAR.

Witnesses:
WALTER W. GARTH,
WM. T. CONLEY.